United States Patent [19]
Bateman et al.

[11] 3,947,810
[45] Mar. 30, 1976

[54] NEGATIVE CLIMB RATE AFTER TAKE-OFF WARNING SYSTEM WITH PREDETERMINED LOSS OF ALTITUDE INHIBIT

[75] Inventors: Charles Donald Bateman, Bellevue; Hans Rudolf Muller, Kirkland, both of Wash.

[73] Assignee: Sundstrand Data Control, Inc., Redmond, Wash.

[22] Filed: Jan. 22, 1975

[21] Appl. No.: 540,477

[52] U.S. Cl. ........ 340/27 AT; 73/170 R; 235/150.2; 244/77 D; 343/7 TA; 343/112 A; 343/112 CA
[51] Int. Cl.².......................................... G01C 5/00
[58] Field of Search ............. 73/178 R, 178 T, 179; 179/15 A; 235/150.2, 150.22; 244/77 A, 77 D; 340/16 R, 16 L, 16 M, 27, 29, 52 H, 56, 62, 66, 74, 258; 343/5 LS, 7 R, 7 A, 7 ED, 7 DF, 7.7, 8, 9, 12 R, 12 A, 108 R, 112 A, 112 CA, 5

[56] References Cited
UNITED STATES PATENTS

| | | |
|---|---|---|
| 3,167,276 | 1/1965 | Moosbrugger et al. ............ 244/77 D |
| 3,245,076 | 4/1966 | Le Tilly et al. .................... 343/7 TA |
| 3,524,612 | 8/1970 | Ainsworth et al. ............... 244/77 D |
| 3,578,269 | 5/1971 | Kramer et al. .................... 244/77 D |

OTHER PUBLICATIONS

Brantley, James Q, Radar Offers Solution to Mid Air Collisions, Electronics, 11–1954, p. 146–150.

*Primary Examiner*—Trygve M. Blix
*Assistant Examiner*—Stephen G. Kunin
*Attorney, Agent, or Firm*—Wegner, Stellman, McCord, Wiles & Wood

[57] ABSTRACT

In a warning system for aircraft that generates a warning signal when the aircraft is descending during a take-off or missed approach phase of operation, the warning is inhibited for a predetermined loss of altitude in order to allow the aircraft to descend a short distance without triggering a nuisance warning. Specifically, a circuit is provided to integrate a signal representing the aircraft's rate of descent until the integrated signal is equal to a predetermined drop in altitude whereupon the warning signal is triggered.

27 Claims, 3 Drawing Figures

NEGATIVE CLIMB RATE AFTER TAKE-OFF WARNING SYSTEM WITH PREDETERMINED LOSS OF ALTITUDE INHIBIT

BACKGROUND OF THE INVENTION

The invention relates to the field of aircraft ground proximity warning systems and, in particular, to systems that warn of a negative rate of climb after takeoff or during a missed approach.

In the prior art systems, as specifically represented by the U.S. Pat. application of Bateman, Ser. No. 480,727, filed on June 19, 1974, entitled "Aircraft Ground Proximity Warning Instrument," assigned to the assignee of this application, a warning signal is sounded during the takeoff or missed approach phase of aircraft operation whenever there is an indication of a negative rate of climb, i.e. a momentary descent toward the ground. In the prior art system, the takeoff or missed approach phase of operation is indicated to the warning instrument by means of signals representing the flight configuration of the aircraft, such as flap and landing gear settings. In addition, this particular warning mode is operative only at altitudes of from 50 feet to 700 feet above ground where it is assumed that in normal operation the aircraft will be climbing. However, there are circumstances under which during a normal takeoff and climbout the aircraft will level off below this 700 feet level. In the prior art systems even a momentary negative climb rate of 100 feet per minute triggers the warning signal. In addition to takeoff, a missed approach procedure, where this particular warning mode is also operative, would also tend to generate warnings if the pilot does not follow the missed approach procedure precisely as directed. Both of these circumstances will give rise to unnecessary or nuisance warnings which may reduce the confidence that air crews place in the warning system.

One approach to eliminating this problem would involve increasing the required negative climb rate to a value greater than 100 feet per minute, for example 500 feet per minute, but this would have the undesired effect of eliminating valid warnings where the aircraft continues to descent toward the ground at a relatively low descent rate.

SUMMARY OF THE INVENTION

It is therefore an object of the invention to provide a negative climb warning system that is operative only after a predetermined loss of altitude.

It is another object of the invention to provide a circuit that will inhibit a negative climb warning signal until the aircraft has descended a predetermined amount of altitude.

It is a further object of the invention to provide an integrating circuit responsive to a rate of change a barometric altitude signal for measuring the distance that the aircraft has descended and inhibiting the negative climb warning until the predetermined descent has occurred.

In order to eliminate the above described nuisance warnings in a negative climb warning system the distance that the aircraft descends during a negative climb is measured. During this time the warning signal is inhibited so as not to produce nuisance warnings for very small or short term descents of the aircraft during a takeoff or missed approach phase of operation. The distance that the aircraft has descended is measured by integrating a signal that represents the rate of change in the aircraft's barometric altitude. When the integrated barometric rate of change signal exceeds a predetermined amount for a particular altitude, for example the equivalent of a 75 foot descent at an altitude of 200 feet, the system will enable the signal generating means. The enabling response is scaled so that the greater the altitude above ground the greater the descent required to remove the inhibit from the warning signal. By using this particular method of enabling the warning signal, the aircraft may descend for a brief period and still not trigger the warning system, thereby eliminating this type of nuisance warning.

DETAILED DESCRIPTION OF THE INVENTION

Figure 1:
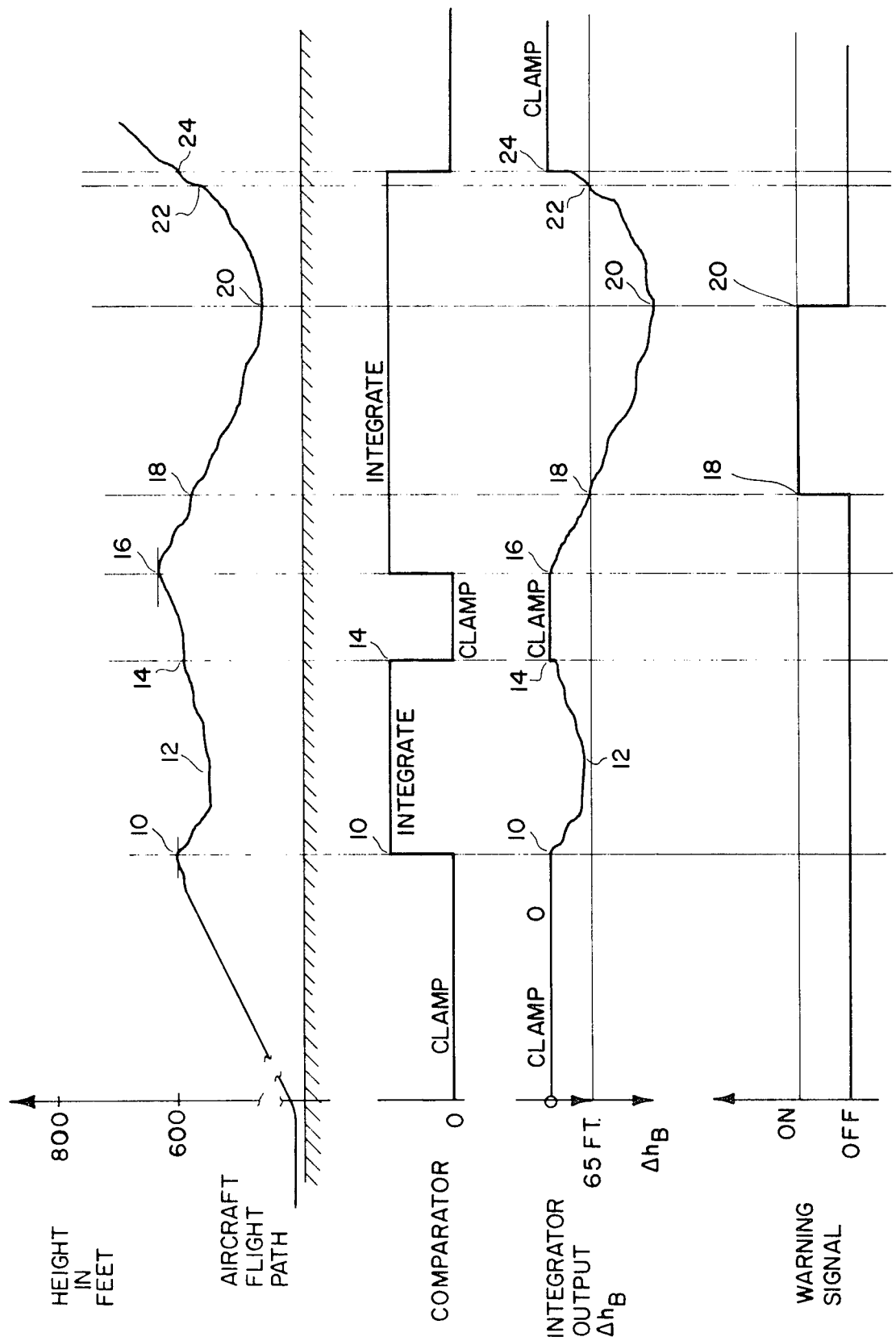
FIG. 1 is a graphic illustration of the operation of the warning system for an aircraft flight path.

An illustration of the operation of the negative climb warning signal inhibiting function with respect to a hypothetical aircraft flight path is provided in FIG. 1 of the drawings. As the aircraft gains altitude to point 10, as shown in the aircraft flight path portion of FIG. 1, the output of the integrator circuit which serves to measure the amount of altitude that the aircraft has descended will remain zero. This amount of altitude that the aircraft has descended, or the net loss in altitude, is indicated in the figures as $\Delta h_B$. As the aircraft begins to descend from point 10 to point 12 on its flight path, the electronic clamp on the integrator is removed and the integrator circuit begins to generate a voltage representing the total amount of descent in feet. Assuming at this point, point 12 of the aircraft flight path, that the aircraft has not descended sufficiently for the output of the integrator to remove the inhibit from the warning signal, no negative climb warning will be generated as shown on the warning signal portion of FIG. 1.

As the aircraft begins to regain altitude, starting from point 12 to point 14, the output voltage of the integrator will gradually decrease until the aircraft has reached approximately the same altitude, at point 14, that it began its descent. At this point, the output of the integrator again becomes and remains zero because the clamp is applied as the aircraft continues to climb along its flight path to point 16.

At point 16 of the aircraft flight path, the aircraft again begins to descend until it reaches a point 18, which is approximately 65 feet below point 16. As the aircraft descends from point 16 to 18, the clamp is removed and the integrator circuit's output increases in voltage until at the point 18 in its flight path, the integrator output voltage is sufficient to exceed the permissible altitude loss threshold thereby permitting the warning signal to be generated. This warning signal will continue to be generated as the aircraft descends to its lowest point, 20 of FIG. 1, where the warning signal is terminated. The increase in altitude from point 20 to 22 along the flight path will cause the integrator to reduce its voltage output until the output has been decreased, at point 22, to a value that will reimpose the inhibit on the warning signal. As the aircraft continues to climb past point 24 in its flight path, the voltage output of the integrator will return to zero and remain zero.

Figure 2:
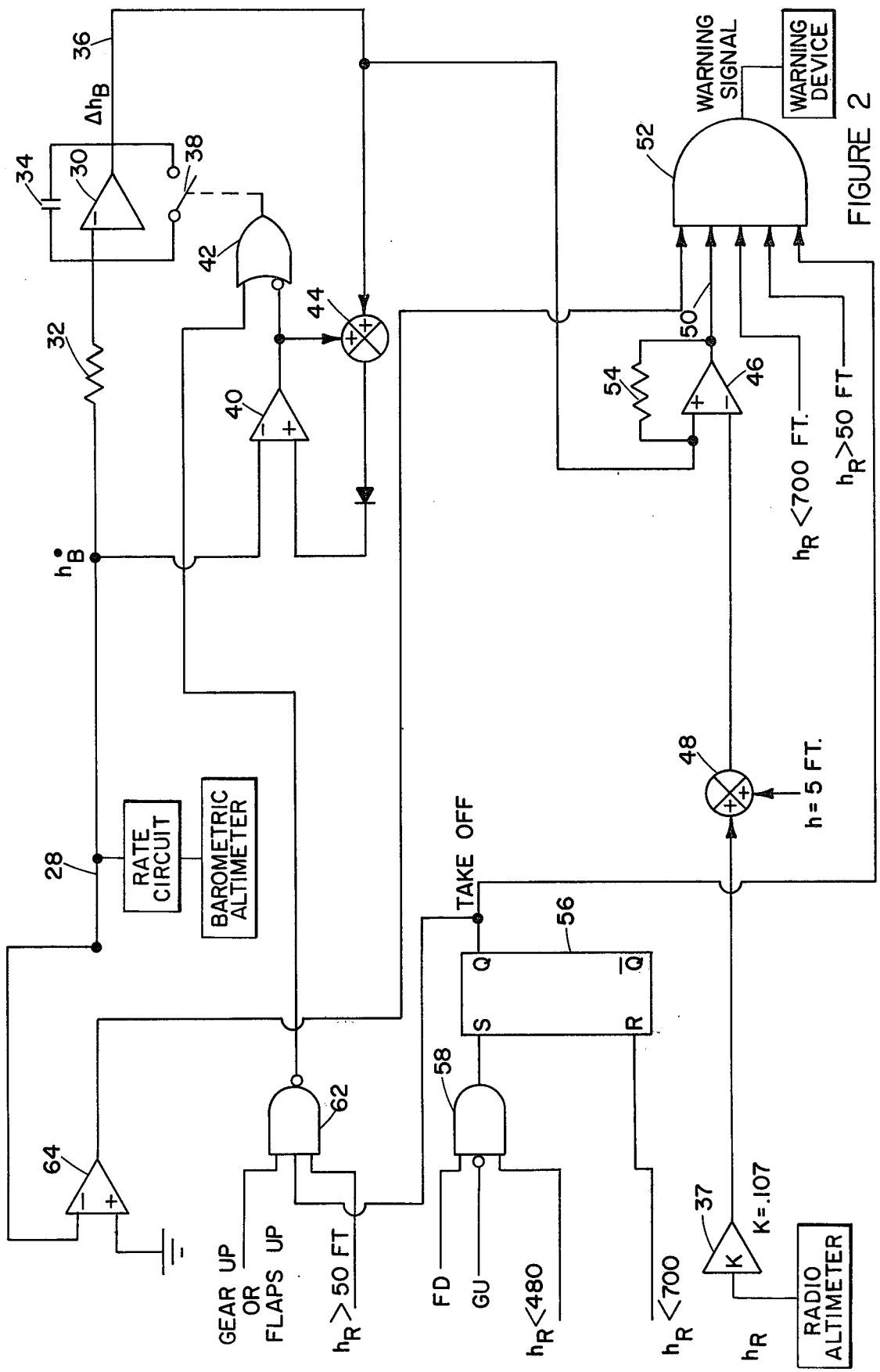
FIG. 2 is a functional block diagram of the circuit for implementing the warning system.

A functional block diagram presenting the preferred embodiment of the invention is set forth in FIG. 2 of the drawings. A signal $h_B$, representing the rate of change of the aircraft altitude, is applied to the circuit on line 28. This signal can be generated and will have similar characterisitcs to the rate of change in barometric altitude signal disclosed in the Bateman Application Ser. No. 480,727. The $h_B$ signal provides the primary input to an integrating amplifier 30. The time constant of the integrating amplifier is governed by the values of the resistor 32 and the capacitor 34, which in the preferred embodiment have values to provide the integrator amplifier with a time constant of approximately one second, so that the output of the amplifier 30 on line 36 will represent approximately the absolute amount of the change in barometric altitude in feet.

The integrating amplifier 30 also has a clamp which is represented by the switch 38. The clamp 38 wil maintain the output of the amplifier 30 at zero as long as the clamp switch 38 is closed. When the clamp switch 38 is open, the amplifier 30 is free to generate a voltage on line 36 that will approximately represent the change in the aircraft barometric alitude.

The clamp switch 38 of the integrator amplfier 30 is controlled by signals generated by the comparator amplifier 40 transmitted through the OR gate 42. The $h_B$ signal is applied to the negative terminal of the comparator amplifier 40. As soon as the aircraft begins to descend, for example point 10 of FIG. 1, the $h_B$ signal will become negative thereby causing the comparator amplifier 40 to emit a positive signal. The positive signal, as emitted by the comparator amplifier 40 will, in effect, be inverted by the OR gate 42 and serve to open the clamp switch 38, thus permitting an output voltage representing a change in altitude to be generated on line 36. The output voltage on line 36 is combined with the output of the comparator 40 in the summing junction 44 which, in turn, serves as a positive feedback loop to the positive terminal of the comparator amplifier 40. The primary effect of the positive feedback loop of the comparator 40 is to maintain the integrating amplifier in an integrating mode until the output voltage on line 36 essentially returns to a zero value. The operation of the comparator 40 is illustrated in FIG. 1, where at point 10 the comparator 40 generates a positive output serving to remove the clamp from the integrating amplifier 30. The comparator 40 will remain in a positive state until the aircraft returns to approximately its original altitude at point 14 whereupon the approximate zero voltage on line 36, in combination with a positive $h_B$ signal, will cause the comparator 40 to switch back to a zero output. The inverted comparator output at an input to OR gate 42 provides an output closing integrator clamp switch 38.

Figure 3:
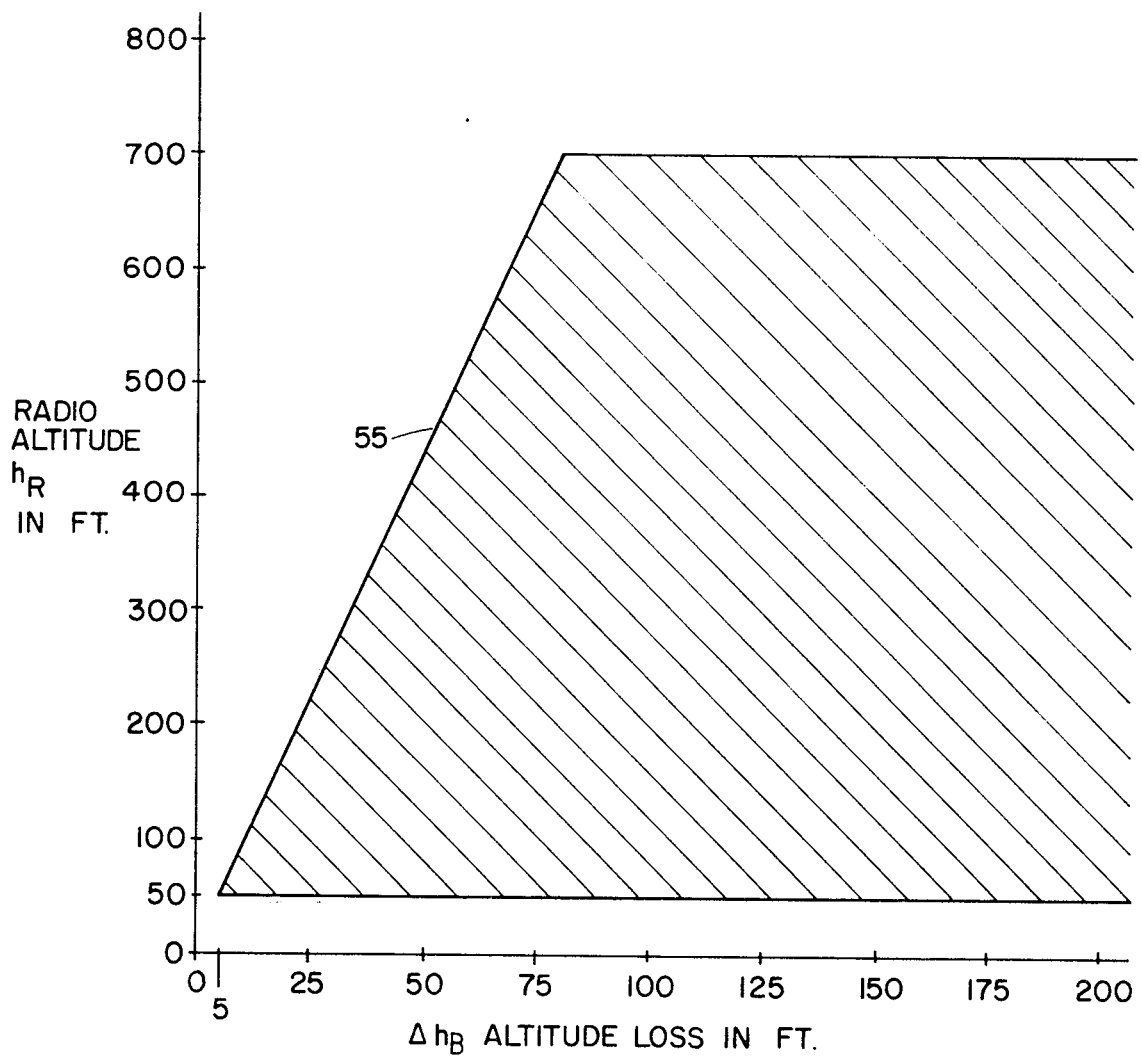
FIG. 3 is a graph illustrating the relationship between radio altitude and the amount of altitude the aircraft must descend before the inhibit is removed from the warning signal.

The signal on line 36 representing the change in altitude is applied to the positive terminal of the comparator 46. The $h_R$ signal, representing the aircraft radio altitude above ground, is transmitted through the scaling amplifier 37 and combined with a 5 foot bias signal in the summing junction 48. The resulting signal is applied to the negative terminal of the comparator amplifier 46. Whenever the voltage applied to the positive terminal of the comparator 46 is greater than the voltage applied to the negative terminal, the comparator will produce a positive signal on line 50 tending to enable the AND gate 52. The comparator 46 includes a positive feedback loop including the resistor 54 that, in combination with the voltage representing the change in altitude on line 36 and the biased radio altitude signal on the negative terminal, will produce the operational characteristic defined by the line 55 in the graph of FIG. 3. As indicated in FIG. 3, the greater the radio altitude, the larger the altitude loss must be to trigger the comparator 46 and hence remove the inhibit from the negative climb warning signal.

As a result, the greater the aircraft altitude above the ground the greater the aircraft's descent will have to be in order to remove the inhibit from the negative climb warning signal. The shaded area to the right of line 55 of FIG. 3 indicates the conditions of altitude versus descent of the aircraft which will remove the inhibit from the warning signal.

The other inputs to the AND gate 52 illustrate the other conditions in which this particular warning signal is inhibited. For example, the aircraft must be between 50 feet and 700 feet from the ground. In addition, the aircraft must be in a takeoff mode.

The takeoff mode is indicated by a positive output from the Q terminal of the flip-flop 56. The flip-flop 56 is set just as the aircraft is about to land when the flaps are down and the landing gear are down, generating a positive output from the AND gate 58. This can occur only below 480 feet which allows the flip-flop 56 to set with a positive output on its Q terminal. The flip-flop 56 will remain set through the takeoff and climb out of the aircraft until it reaches an altitude greater than 700 feet where, since the flaps and the landing gear will be in an up position, the gate 58 will be off and the signal indicating that the aircraft altitude is above 700 feet serves to reset the flip-flop. It should be noted at this point that during the last stages of landing where the flip-flop 56 is set, the negative climb warning signal will be inhibited by gate 62 because the landing gear must be up to unclamp the integratar 30 whereas, as indicated by the AND gate 58, the gear must be down to set the flip-flop 56.

The AND gate 62 will, in effect, inhibit the negative climb warning signal unless the landing gear is up, the aircraft is in a takeoff mode and is above 50 feet in altitude, by transmitting a positive signal through the OR gate 42 to clamp the inegrator amplifier 30. This particular feature permits the negative climb warning signal to become active during a missed approach procedure since the aircraft will generally be below 700 feet but above 50 feet in a takeoff mode and with the landing gear and flaps raised in order to permit the aircraft to go around for another approach.

Another inhibit signal is received at the AND gate 52 from the comparator 64, which prevents the warning signal from being generated when the aircraft is climbing. The $h_B$ signal on line 28 is applied to the negative terminal of the comparator 64 and the positive terminal is connected to ground. This will result in a low signal, or negative output, from the comparaor 64 to the AND gate 52 whenever the aircraft is climbing, thus inhibiting the warning signal. This feature is particularly useful since it eliminates the requirement for the aircraft to regain most of its lost altitude before the warning will shut off. The operation of this warning signal inhibit is illustrated at point 20 of FIG. 1.

The various altitudes and descent rates described herein are provided in order to illustrate the preferred embodiment of the invention and are not intended to limit the scope of the disclosure or the invention claimed.

We claim:

1. In an aircraft instrument for warning the pilot of an excessive descent following a climb during a takeoff or a missed landing approach maneuver, said instrument having a source of signal representing the vertical motion of the aircraft, improved means establishing a warning criteria, comprising:
   means responsive to said vertical motion signal for establishing a signal representing the net altitude loss of the aircraft from the high point of the flight path;
   means for establishing an excessive altitude loss signal;
   means for comparing said net altitude loss signal with said excessive altitude loss signal, the comparing means output indicating whether the net altitude loss which has occurred is excessive; and
   means responsive to an output of the comparing means indicating an excessive net altitude loss for initiating a pilot warning.

2. The aircraft warning instrument of claim 1 in which the instrument includes a source of signal representing the altitude of the aircraft above the ground and the means establishing an excessive altitude loss signal is responsive to the altitutde above ground signal.

3. The aircraft warning instrument of claim 2 in which the excessive altitude loss signal is directly related to the altitude above the ground signal.

4. The aircraft warning instrument of claim 1 in which the source of signal representing the vertical motion of the aircraft is a source of barometric altitude rate signal and said means to establish a signal representing the net altitude loss is an integrator.

5. The aircraft warning instrument of claim 1 in which the means for initiating a pilot warning is connected with said source of vertical motion signal and is enabled when said aircraft is descending.

6. A negative climb warning system for use in aircraft in a nonlanding configuration comprising:
   rate means responsive to a barometric altimeter and including an electronic circuit to differentiate the signal from the barometric altimeter with respect to time for generating a signal representing the rate of change in aircraft altitude;
   configuration means responsive to signals indicating the operative condition of the aircraft flaps and landing gear for generating signals representing the aircraft flight configuration;
   measuring means responsive to said rate means for measuring the descent of the aircraft; and
   warning means responsive to said measuring means and said configuration means for generating a warning signal indicating that the aircraft is descending after descending a predetermined distance.

7. The system of claim 6 wherein said measuring means includes an electronic circuit for integrating said differentiated barometric signal and generating a signal representing a net loss of altitude.

8. The system of claim 7 wherein said warning means is additionally responsive to a radar altimeter signal for generating said warning signal as a function of both said net loss of altitude signal and the aircraft's altitude above ground.

9. The system of claim 8 wherein said warning means generates said descent warning signal as a linear function of the increase in said net loss signal as compared to increasing aircraft altitude.

10. A negative climb warning system for an aricraft having a barometric and radio altimeter comprising:
    means for measuring the aircraft's net loss in barometric altitude;
    means for comparing said net loss of altitude with the radio altitude;
    means responsive to said comparing means for generating a warning signal when said net loss exceeds a predetermined amount for a predetermined altitude.

11. Th system of claim 10 additionally including means to inhibit said warning signal above a first predetermined altitude and below a second predetermined altitude.

12. The system of claim 11 additionally including means to inhibit said warning signals during predetermined phases of aircraft operation.

13. The system of claim 10 additionally including means to inhibit said warning signals when the aircraft is gaining altitude.

14. A system for warning of aircraft descent while in a non-landing configuration comprising:
    a circuit for generating a signal representing the rate of change in the aircraft's barometric altitude;
    configuration means for generating a plurality of signals representing the aircraft's flight configuration;
    a warning signal generator, responsive to said configuration means and said rate of change in barometric altitude signal, for generating a warning signal when the aircraft is descending in a predefined configuration;
    inhibit means for inhibiting said warning signal; and
    an integrating circuit for integrating said barometric rate of change signal and removing said warning signal inhibition after a predetermined descent.

15. An electronic circuit, responsive to rate of change in barometric altitude signals and altitude signals from a radar altimeter, for generating a negative climb warning signal in an aircraft comprising:
    an integrating amplifier for integrating the rate of change in barometric altitude signal thereby producing a signal representing the descent of the aircraft;
    a clamp circuit operatively connected to said integrating amplifier for preventing the output of said descent signal from said integrating amplifier;
    a first comparator circuit responsive to said rate of change in said barometric signal and said descent signal for activating said clamp circuit;
    a summing junction for combining the radar altitude signal with a biasing signal;
    a second comparator circuit, operatively connected wtih said integrating amplifier and said summing junction, to generate a logic signal indicating that said descent signal has exceed a predefined value with respect to said biased altitude signal;
    a first logic circuit, operatively connected to said second comparator circuit and responsive to the altitude signal, to inhibit said logic signal above and below predefined altitudes; to inhibit said logic signal above and below predefined altitudes; and
    means responsive to said logic signal for generating the negative climb warning.

16. The circuit of claim 15 additionally including:
a flip-flop circuit for indicating the phase of flight operation of the aircraft;
a second logic circuit, responsive to signals indicating flap, landing gear, and altitude condition of the aircraft, for setting said flip-flop circuit;
a third logic circuit responsive to signals indicating the altitude of the aircraft for resetting said flip-flop; and
a circuit element for transmitting the logical setting of said flip-flop to said clamp circuit.

17. The circuit of claim 15 additionally including a circuit element to transmit the logical setting of said flip-flop to said first logic circuit.

18. The circuit of claim 15 additionally including a third comparator circuit, responsive to the rate of change in barometric altitude signal and operatively connected to said first logic circuit, to inhibit said logic signal in response to an increase in barometric altitude.

19. An aircraft warning instrument for alerting the pilot of an aircraft to a condition of excessive descent following takeoff or a missed landing approach, comprising:
a source of signal representing the rate of change of altitude of the aircraft;
a source of signal representing the altitude of the aircraft above the ground;
means responsive to the rate signal for generating a signal representing the net loss in aircraft altitude from the high point of the flight path;
means for directly comparing the aircraft altitude net loss signal with the altitude above ground signal; and
means responsive to said comparing means to actuate a pilot warning device when the net distance which the aircraft has descended is excessive for the aircraft altitude above ground.

20. The aircraft warning instrument of claim 19 including means responsive to the aircraft rate of change of altitude signal for inhibiting the pilot warning so long as the aircraft is climbing.

21. The aircraft warning instrument of claim 19 in which the means for generating the aircraft altitude change signal is an integrator having its input connected with the source of altitude rate signal and having an output representing the change of aircraft altitude.

22. The aircraft warning instrument of claim 21 including means for clamping the integrator output to a reference level.

23. The aircraft warning instrument of claim 22 in which said integrator clamp means is responsive to the aircraft configuration to unclamp the integrator from the reference level on takeoff.

24. The aircraft warning instrument of claim 22 in which said integrator clamp means is responsive to the aircraft configuration to unclamp the integrator from the reference level on missed landing approach.

25. The aircraft warning instrument of claim 22 in which said integrator clamp means is responsive to an extended condition of the aircraft landing gear or flaps to clamp the integrator to the reference level on landing approach.

26. The aircraft warning instrument of claim 22 in which said integrator clamp means is responsive to a retracted condition of the aircraft landing gear or flaps to unclamp the integrator from said reference level on takeoff or a missed landing approach.

27. The aircraft warning instrument of claim 22 in which said integrator output clamp means is responsive to a combination of a change of aircraft altitude signal representing a climb of the aircraft and to an integrator output representing no accumulated descent to clamp the integrator to the reference level.

* * * * *

UNITED STATES PATENT OFFICE
CERTIFICATE OF CORRECTION

Patent No. 3,947,810                Dated March 30, 1976

Inventor(s) Charles Donald Bateman and Hans Rudolf Muller

It is certified that error appears in the above-identified patent and that said Letters Patent are hereby corrected as shown below:

Column 6, claim 11, line 15, delete "Th" and substitute --The--;

claim 15, line 58, delete "wtih" and substitute --with--;

lines 64 and 65, delete "to inhibit said logic signal above and below predefined altitudes;".

Signed and Sealed this

Twelfth Day of February 1980

[SEAL]

Attest:

SIDNEY A. DIAMOND

Attesting Officer      Commissioner of Patents and Trademarks

UNITED STATES PATENT AND TRADEMARK OFFICE
CERTIFICATE OF CORRECTION

PATENT NO. : 3,947,810
DATED : March 30, 1976
INVENTOR(S) : CHARLES DONALD BATEMAN and HANS RUDOLF MULLER It is certified that error appears in the above-identified patent and that said Letters Patent are hereby corrected as shown below:

Column 8, claim 21, line 9, delete "change" and substitute --net loss--.

Column 8, line 7, (claim 21, line 3) "change" should read -- net loss --.

Signed and Sealed this

Eleventh Day of November 1980

[SEAL]

Attest:

SIDNEY A. DIAMOND

Attesting Officer

Commissioner of Patents and Trademarks